US008451512B2

(12) United States Patent
Sheng

(10) Patent No.: US 8,451,512 B2

(45) Date of Patent: May 28, 2013

(54) SCANNER HAVING BACKGROUND ASSEMBLY

(75) Inventor: Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 365 days.

(21) Appl. No.: 12/961,157

(22) Filed: Dec. 6, 2010

(65) Prior Publication Data

US 2011/0141533 A1 Jun. 16, 2011

(30) Foreign Application Priority Data

Dec. 15, 2009 (TW) ............................... 98142819 A

(51) Int. Cl.
*H04N 1/04* (2006.01)

(52) U.S. Cl.
USPC ............ 358/474; 358/475; 358/497; 358/471

(58) Field of Classification Search
USPC .......................... 358/474, 475, 497, 471, 484
See application file for complete search history.

(56) References Cited

U.S. PATENT DOCUMENTS 7,692,822 B2 * 4/2010 Tanaka .......................... 358/474
2009/0296172 A1 * 12/2009 Iwatsuka ....................... 358/509

* cited by examiner

*Primary Examiner* — Houshang Safaipour

(57) ABSTRACT

A scanner includes a reference backing member, a scan assembly and a light-obstruction member. The scan assembly, disposed opposite the reference backing member, scans a reference block of the reference backing member and an original block of an original in a scan region. The scan assembly includes a light source for emitting a first light beam in a direction toward the reference block, and emitting a second light beam in a direction toward the original block. The light-obstruction member, disposed between the reference backing member and the scan assembly, includes a light-obstruction part, disposed in a first optical path of the first light beam and outside a second optical path of the second light beam, for blocking a portion of the first light beam from reaching the reference block.

13 Claims, 4 Drawing Sheets

1
61
62
63
64
60
90
92
94
80
50
Z1
L1
30
10
2
40
50A
D
22
20
26
30A
24
Z2
L2
OB
RB
50B
O
70

94
92
80
50
30
Z1
10
L1
22
20
26
24
30A
L2
23
Z2
OB
RB
50A
90
92
94

SCANNER HAVING BACKGROUND ASSEMBLY

This application claims priority of No. 098142819 filed in Taiwan R.O.C. on Dec. 15, 2009 under 35 USC 119, the entire content of which is hereby incorporated by reference.

BACKGROUND OF THE INVENTION

1. Field of the Invention

The present invention relates to a scanner having a background assembly, and more particularly to a scanner having a light-obstruction member for blocking a portion of light beams from reaching a reference backing member which is used for calibration of scanner characteristics and for foreground detection.

2. Related Art

In a conventional scanner, a white calibration sheet is usually provided to facilitate the calibration, detection and compensation of the characteristics of a light source and an image sensor of the scanner. However, the white calibration sheet cannot facilitate detecting the foreground of a document with a white edge, and thus the scanned image quality is affected. In a sheet-fed scanner, a scanning module is stationary, and the white calibration sheet is disposed above a scan window and at a scan position. If the light source emits light beams from an upstream side of the scan position, then the image representative of the leading edge of the document is shadowed when the leading edge almost reaches the scan position. Likewise, if the light source emits the light beams from a downstream side of the scan position, then the image representative of the trailing edge of the document is shadowed when the trailing edge just leaves the scan position. Because the document blocks a portion of the illumination of the light source on the white calibration sheet and the light beams reflected by the white calibration sheet and received by the image sensor is lower than a threshold value, when the scanned image is being processed, the image of the white calibration sheet is thus determined as one portion of the image of the leading edge of the document. As a result, a dark shade would be produced at the front section or rear section of the scanned image of the document, and the scanned image could not faithfully represent the original image of the document.

Most documents have white edges, and a black background sheet is provided to facilitate detecting the edges of the document and obtaining reference for document size detection and image cropping. If the functions of characteristics calibration and edge detection are to be integrated, a switchable background sheet is usually employed in the prior art. The background sheet can be switched to the white background when the scanner is being calibrated, and the background sheet can be switched to the black background for edge detection.

Although the switchable background sheet can accomplish both functions of the edge detection and scanner characteristics calibration, more components are required in order to switch the background sheet. Thus, the size of the scanner is increased and the design of the conventional scanner is relatively complicated.

SUMMARY OF THE INVENTION

Accordingly, the present invention has been proposed to solve the problems of the prior art, and it is an object of the present invention to provide a scanner having a background assembly, which has a light-obstruction member for blocking a portion of light beams from reaching a reference backing member of the background assembly which is used for calibration of scanner characteristics and for foreground detection.

To achieve the above-identified object, the present invention provides a scanner having a reference backing member, a scan assembly and a light-obstruction member. The scan assembly, disposed opposite the reference backing member, is used for scanning a reference block of the reference backing member and an original block of an original in a scan region. The scan assembly includes a light source for emitting a first light beam in a direction toward the reference block and emitting a second light beam in a direction toward the original block. The light-obstruction member, disposed between the reference backing member and the scan assembly, includes a light-obstruction part, disposed in a first optical path of the first light beam and outside a second optical path of the second light beam, for blocking a portion of the first light beam from reaching the reference block.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings.

Figure 1:
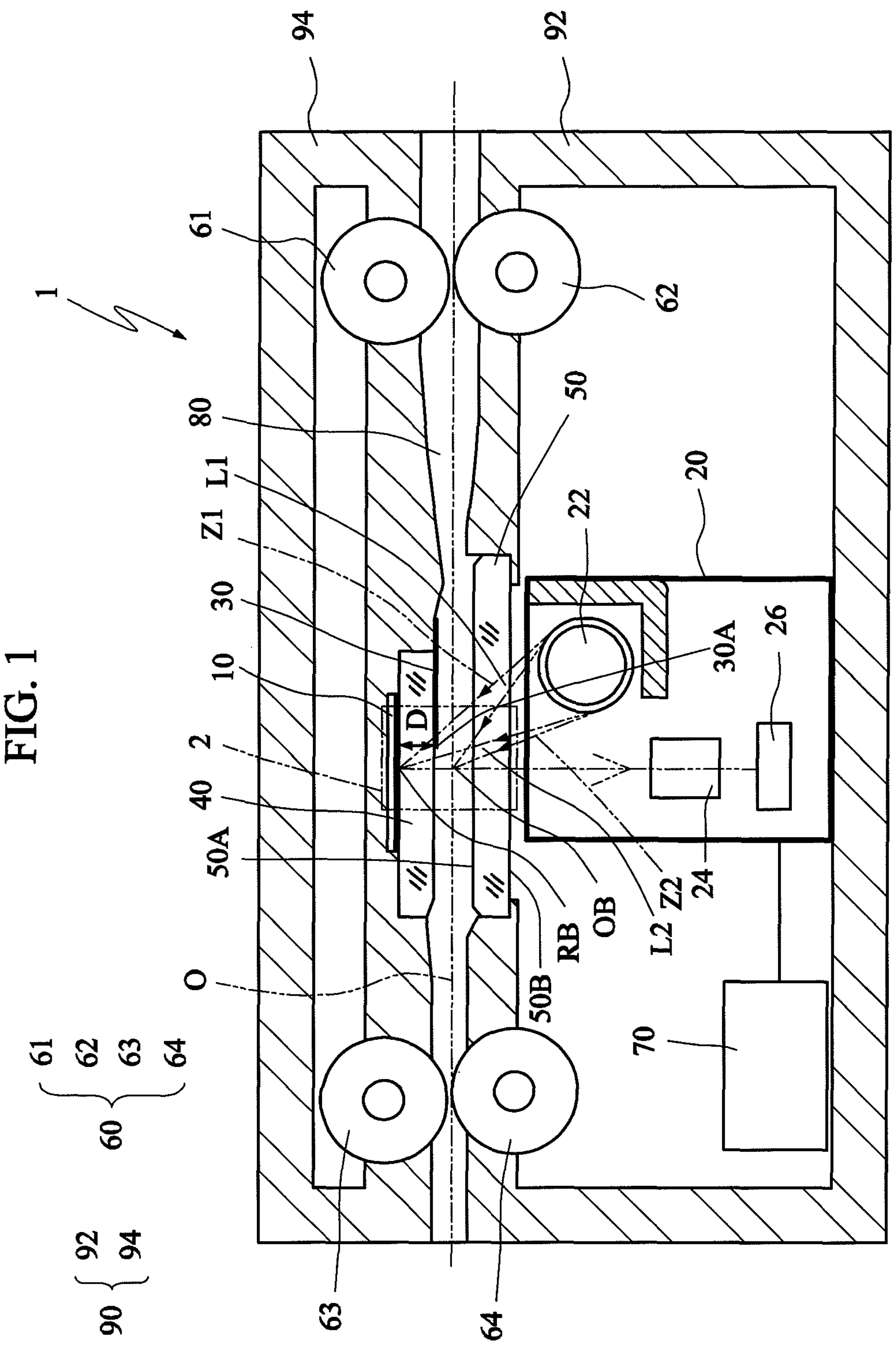
FIG. 1 is a schematic illustration showing a scanner having a background assembly according to a first embodiment of the present invention.

FIG. 1 is a schematic illustration showing a scanner 1 having a background assembly according to a first embodiment of the present invention. Referring to FIG. 1, the scanner 1 of this embodiment includes a reference backing member 10, a scan assembly 20 and a light-obstruction member 30, all of which are mounted in a body 90. The body 90 includes a first part 92 and a second part 94. The first part 92 and the second part 94 form a sheet passageway 80.

The reference backing member 10 may be a white backing member or a colored member. The light-obstruction member 30 may be a colored, transparent member, an opaque member or a translucent member. The integration of the reference backing member 10 and the light-obstruction member 30 may be referred to as a background assembly. The light-obstruction member 30 and the reference backing member 10 may be arranged in parallel and separated by a spacing D. In another example, the light-obstruction member 30 and the reference backing member 10 may be spaced in a non-parallel manner.

The scan assembly 20, disposed opposite the reference backing member 10, scans a reference block RB of the reference backing member 10 and an original block OB of an original O. The reference block RB and the original block OB are located in a scan region 2, which may also be referred to as a scan position 2.

A sheet transporting mechanism 60 of the scanner 1 has a plurality of rollers 61 to 64 for transporting the original O past the scan region 2 along the sheet passageway 80.

The scan assembly 20 includes a light source 22, a lens 24 and an image sensor 26. The light source 22 emits a first light beam L1 in a direction toward the reference block RB, and emits a second light beam L2 in a direction toward the original block OB of the scan region 2. Therefore, the light beams, reflected by the reference block RB and the original block OB, can reach the image sensor 26 through the lens 24. The image sensor 26 and the lens 24 define an optical path of the reflected light, and thus the images of the original block OB and the reference block RB are obtained.

Figure 4:
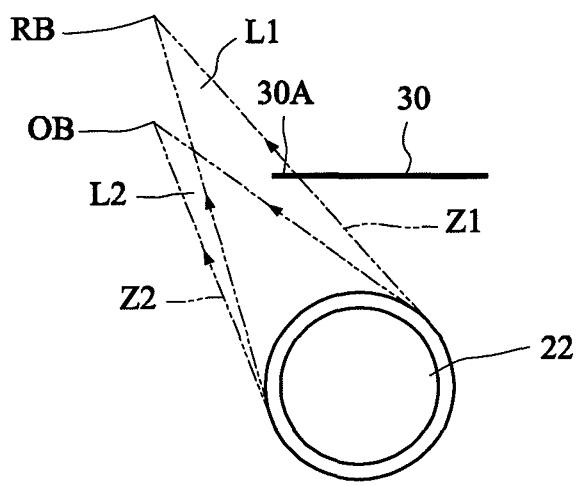
FIG. 4 is a schematic illustration showing a first light beam and a second light beam according to the present invention.

The light-obstruction member 30 is disposed between the reference backing member 10 and the scan assembly 20 and includes the light-obstruction part 30A for blocking a portion of the first light beam L1 from reaching the reference block RB. FIG. 4 is a schematically enlarged illustration showing the first light beam L1 and the second light beam L2 according to the present invention. As shown in FIG. 4, the light-obstruction part 30A is disposed in the first optical path Z1 but outside the second optical path Z2 to block the portion of the first light beam L1 from reaching the reference block RB and allow the second light beam L2 to be fully projected onto the original block OB.

In addition, the scanner 1 may further include a protection layer 40 covering the reference backing member 10. The light-obstruction member 30 is disposed on a surface of the protection layer 40. The protection layer 40 is, for example, a transparent glass sheet mounted in the second part 94, and the size of the spacing D can be adjusted by using a glass sheet of a selected thickness.

Furthermore, the scanner 1 may further include a supporting platen 50, mounted in the first part 92 and disposed between the reference backing member 10 and the scan assembly 20, for supporting the original O to be scanned. The supporting platen 50 has an upper surface 50A and a lower surface 50B. The upper surface 50A is located farther from the scan assembly 20 than the lower surface 50B.

Figure 2:
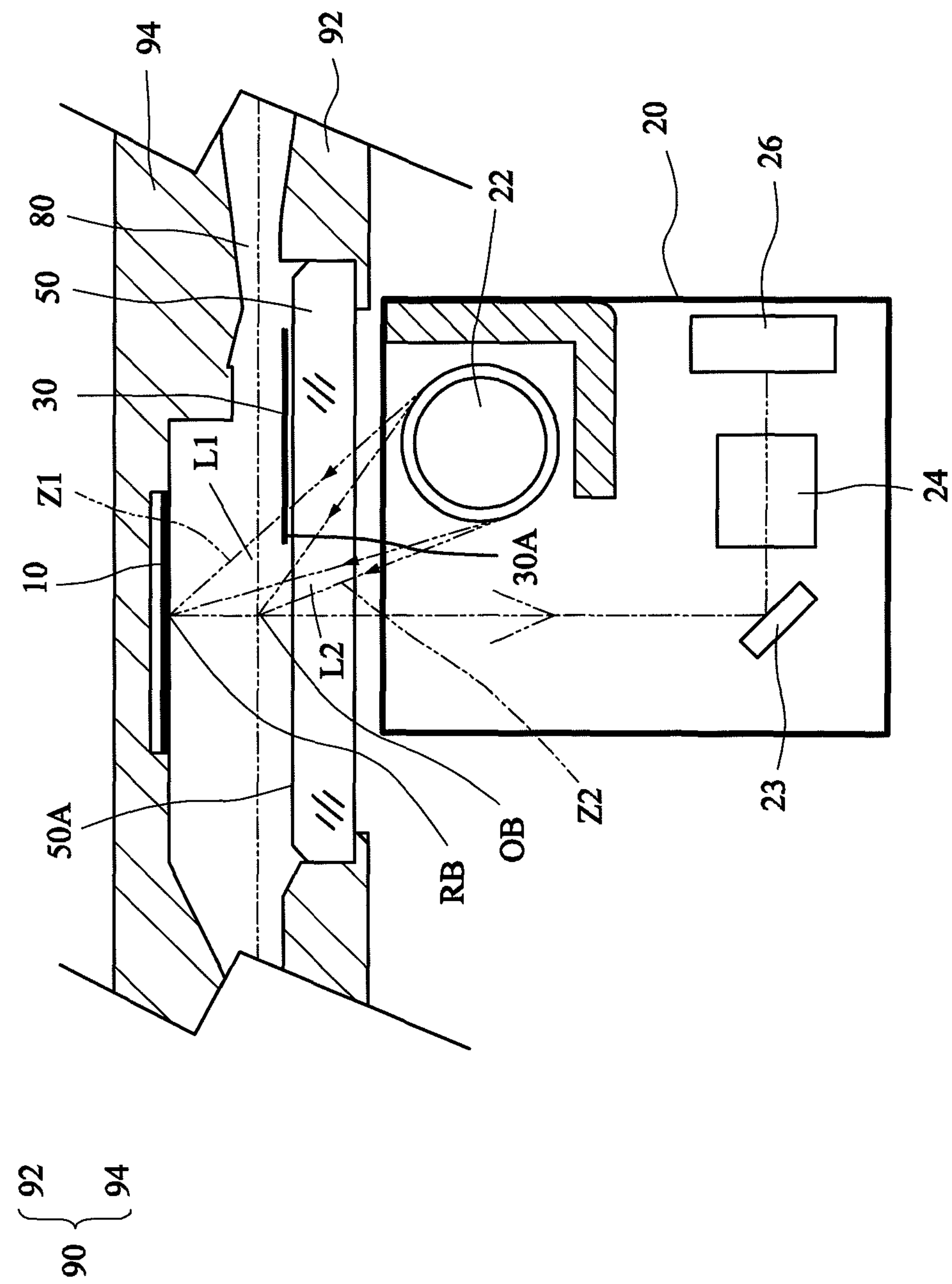
FIG. 2 is a partially schematic illustration showing a scanner according to a second embodiment of the present invention.

FIG. 2 is a partially schematic illustration showing a scanner according to a second embodiment of the present invention. As shown in FIG. 2, the configuration of the scanner is similar to that of FIG. 1, except that the light-obstruction member 30 is disposed on the upper surface 50A of the supporting platen 50 and has no protection layer 40, and that the scan assembly 20 further includes a reflecting mirror 23.

Figure 3:
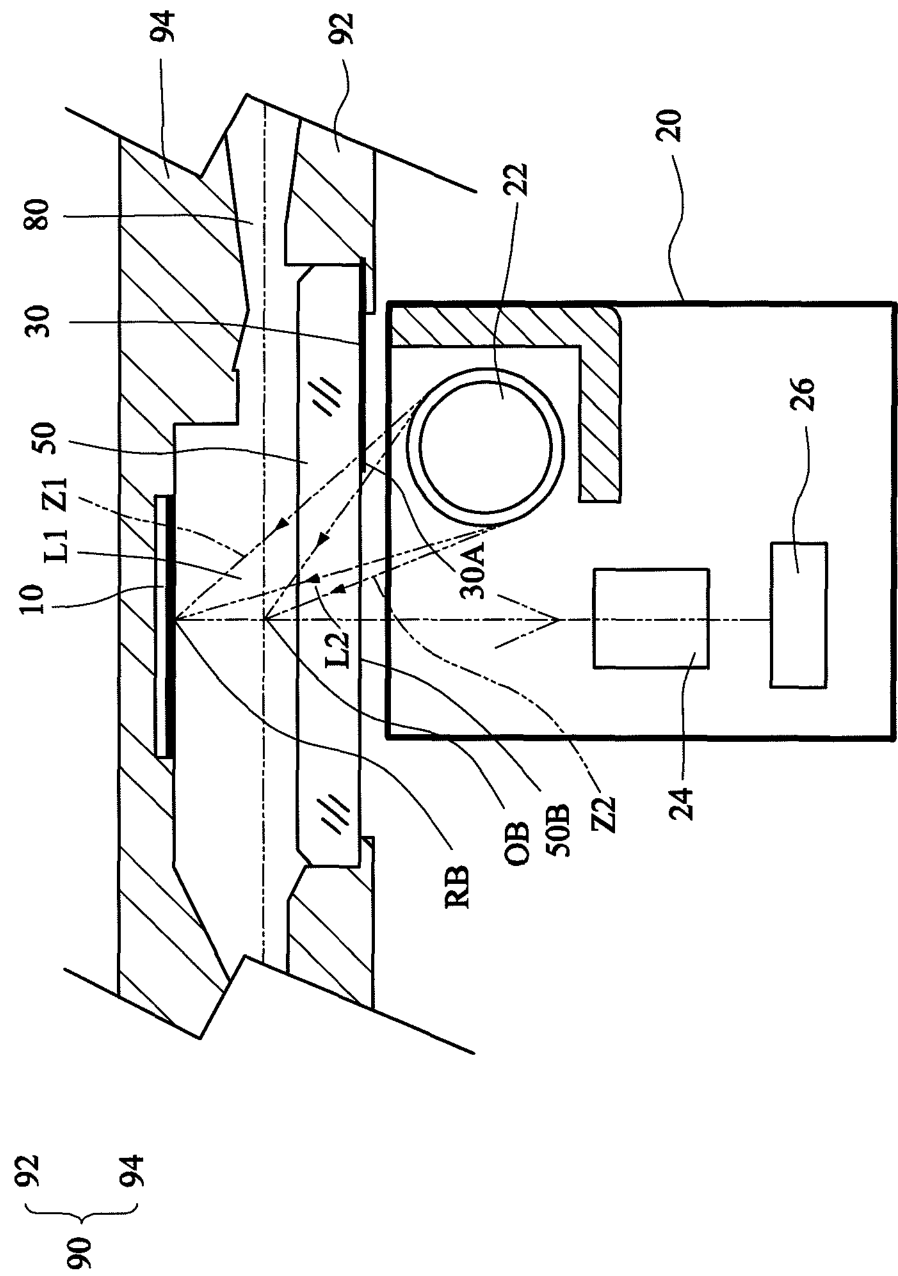
FIG. 3 is a partially schematic illustration showing a scanner according to a third embodiment of the present invention.

FIG. 3 is a partially schematic illustration showing a scanner according to a third embodiment of the present invention. As shown in FIG. 3, the configuration of the scanner is similar to that of FIGS. 1 and 2, except that the light-obstruction member 30 is disposed on the lower surface 50B of the supporting platen 50 and has no protection layer 40.

In order to adjust the position of the light-obstruction part 30A for it to be located in the first optical path Z1 and outside the second optical path Z2, the scanner 1 of the present invention may further include a driving mechanism 70, connected to the scan assembly 20, for driving the scan assembly 20 to change a relative position of the scan assembly 20 to the light-obstruction member 30. This driving mechanism 70 may be a driving mechanism of a flatbed scanner for moving the scan assembly 20 in the scanning operation, and may also be an additional driving mechanism added to a sheet-fed scanner, such that the assembler can perform the adjustment during the assembling processes.

Figure 5:
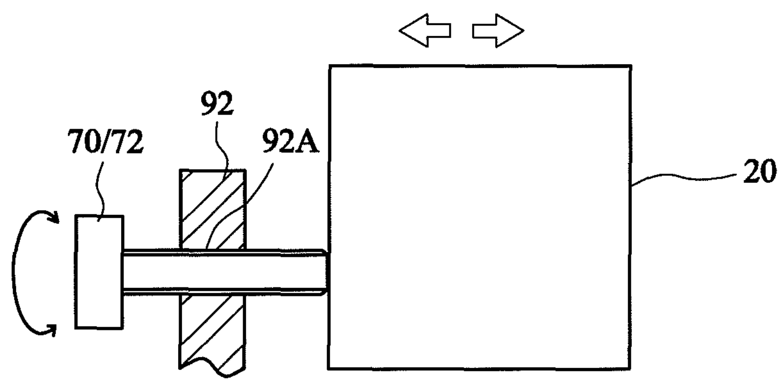
FIG. 5 shows a driving mechanism of FIG. 1.

FIG. 5 shows the driving mechanism 70 of FIG. 1. As shown in FIG. 5, the driving mechanism 70 includes a screw 72 disposed in the first part 92. The screw 72 may be rotated to adjust the relative position of the scan assembly 20 to the light-obstruction member 30. With this screw 72, the manufacturer can finely adjust the location of the light-obstruction member 30 and fix any error induced by the manual operation of adhering the calibration sheet, before the scanner is shipped out. The screw 72 is screwed to a screw hole 92A of the first part 92.

Figure 6:
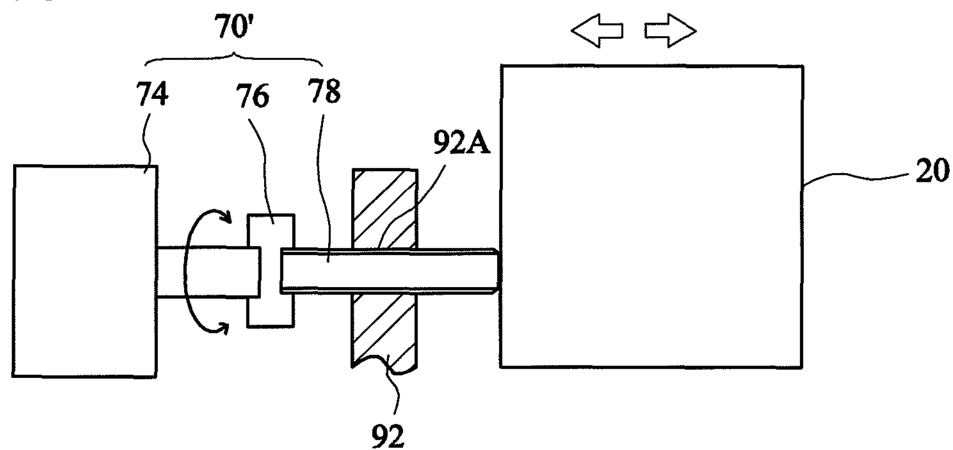
FIG. 6 shows another driving mechanism similar to that of FIG. 5.

FIG. 6 shows another driving mechanism 70' similar to that of FIG. 5. Referring to FIG. 6, the driving mechanism 70' includes a motor 74 for outputting, through a coupler 76 connected thereto, the power to a screw rod 78, and moving the scan assembly 20. The screw rod 78 is screwed to the screw hole 92A of the first part 92.

With the scanner of the present invention, it is possible to simulate the white background as the non-white background and use it for both accurate foreground detection and scanner calibration and compensation, by utilizing the light-blocking effect of the light-obstruction member. In addition, because the reference backing member and the light-obstruction member of the present invention are relatively stationary, no background switching device in the prior art is needed. So, the number of components composing the scanner of the present invention is effectively decreased, and the size of the scanner is considerably reduced.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A scanner, comprising:

a reference backing member;

a scan assembly, disposed opposite the reference backing member, for scanning a reference block of the reference backing member and an original block of an original in a scan region, wherein the scan assembly comprises a light source for emitting a first light beam in a direction toward the reference block and emitting a second light beam in a direction toward the original block; and a light-obstruction member, disposed between the reference backing member and the scan assembly, comprising a light-obstruction part, disposed in a first optical path of the first light beam and outside a second optical path of the second light beam, for blocking a portion of the first light beam from reaching the reference block.

2. The scanner according to claim 1, wherein the reference backing member is a white backing member.

3. The scanner according to claim 1, wherein the light-obstruction member is a colored, transparent member.

4. The scanner according to claim 1, wherein the light-obstruction member is an opaque member.

5. The scanner according to claim 1, wherein the light-obstruction member is separated from the reference backing member by a spacing.

6. The scanner according to claim 5, further comprising a protection layer covering the reference backing member, wherein the light-obstruction member is disposed on one surface of the protection layer.

7. The scanner according to claim 5, further comprising a supporting platen, disposed between the reference backing member and the scan assembly, for supporting the original being scanned, wherein the supporting platen has an upper surface and a lower surface, and the upper surface is located farther from the scan assembly than the lower surface.

8. The scanner according to claim 7, wherein the light-obstruction member is disposed on the upper surface of the supporting platen.

9. The scanner according to claim 7, wherein the light-obstruction member is disposed on the lower surface of the supporting platen.

10. The scanner according to claim 1, further comprising a sheet transporting mechanism for transporting the original past the scan region.

11. The scanner according to claim 1, further comprising:

a driving mechanism, connected to the scan assembly, for driving the scan assembly to adjust a relative position of the scan assembly to the light-obstruction member.

12. The scanner according to claim 11, wherein the driving mechanism comprises a screw, disposed in a body and being rotated to adjust the relative position of the scan assembly to the light-obstruction member.

13. The scanner according to claim 11, wherein the driving mechanism comprises a motor.

* * * * *